United States Patent [19]

Spring

[11] 4,318,496

[45] Mar. 9, 1982

[54] VENDING MACHINE WITH SIDE DELIVERY AND CROSS CONVEYOR

[75] Inventor: Carl E. Spring, La Crosse, Wis.

[73] Assignee: La Crosse Cooler Company, La Crosse, Wis.

[21] Appl. No.: 116,070

[22] Filed: Jan. 28, 1980

[51] Int. Cl.[3] .............................................. B65G 59/06

[52] U.S. Cl. .................................................... 221/129

[58] Field of Search ............... 221/124, 125, 126, 129, 221/236, 237, 253

[56] References Cited

U.S. PATENT DOCUMENTS 2,901,964 9/1959 Johnson .......................... 221/124 X
3,010,556 11/1961 Wawrzonek et al. .......... 221/125 X
3,087,648 4/1963 Cope .............................. 221/129 X
3,482,509 12/1969 Gardner .......................... 222/129 X

*Primary Examiner*—Stanley H. Tollberg
*Attorney, Agent, or Firm*—Wheeler, House, Fuller & Hohenfeldt

[57] ABSTRACT

Disclosed herein is a coin operated vending machine with an article delivery chute located adjacent the side of the front face of the machine. Bottles and cans stored in vertically oriented storage racks are shifted to the side located delivery chute by a sweep bar connected between spaced chains. The sweep bar is actuated in conjunction with the vend cycle so that it is only operating during vending. Location of the delivery chute adjacent one side of the machine enables use of the face of the machine for advertising display.

2 Claims, 7 Drawing Figures

VENDING MACHINE WITH SIDE DELIVERY AND CROSS CONVEYOR

BACKGROUND OF THE INVENTION

Typically article delivery chutes for coin operated beverage vending machines are provided with elongated horizontal slots which substantially interrupt the face of the front door of the vending machine. The storage racks for the containers are aligned and span the width of the slot and discharge directly into the chute, and the container rolls into the slot in approximate alignment with the storage rack. Hence, the doors are not suitable for full length advertising displays. The Oden U.S. Pat. No. 3,464,589 shows a hopper having sloping walls which converge toward a centrally located can outlet. With the Oden patent there is no positive control of the position of the container as it is released from the gate and travels to the outlet, and the centrally located outlet would interfere with a large display or lighting panel. The Smith U.S. Pat. No. 2,212,797 shows a dispenser with two side article delivery chutes, one for each rack of stored containers. If additional storage racks were added, additional outlets would be required.

SUMMARY OF THE INVENTION

The invention provides a coin operated vending machine in which the cans or bottles are delivered from the article delivery chute located adjacent the side of the front of the vending machine to leave a major section of the door uninterrupted. The novel delivery arrangement includes a flight or sweep bar located beneath the container storage racks. The selected can or bottle drops to a pan or tray and the sweep bar sweeps the selected beverage container to the side of the vending machine for discharge down a chute which communicates with a relatively small article delivery chute in the vending machine door. Thus the front surface of the door is available for full length advertising displays, lighted displays, etc.

The flight bar can be supported between spaced endless chains driven by a motor. A circuit is provided including the motor for the flight bar and a stop switch having a switch actuator in the path of movement of the sweep bar to stop the bar at the appropriate position in advance of a full sweeping stroke. Upon energization of the gate motors, the circuit is completed to energize the sweep bar motor to move the sweep bar across the tray. Hence the sweep bar cycles on and off during each vend cycle. The sweep bar and depending flaps maintain positive control and positioning of the container during movement to the discharge chute to insure that the container is properly oriented for movement through the chute.

Further objects, advantages and features of the invention will become apparent from the disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 3:
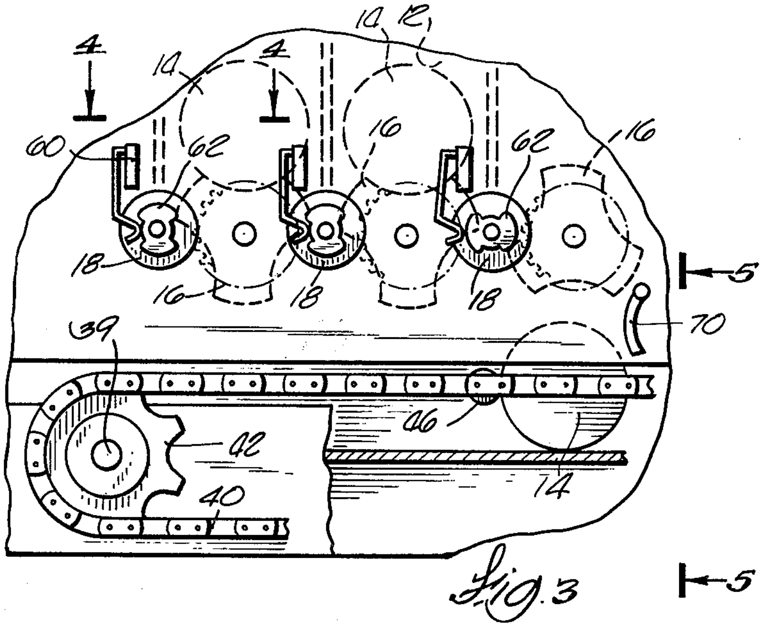
FIG. 3 is an enlarged view of the sweep bar assembly shown in FIG. 1.
Figure 5:
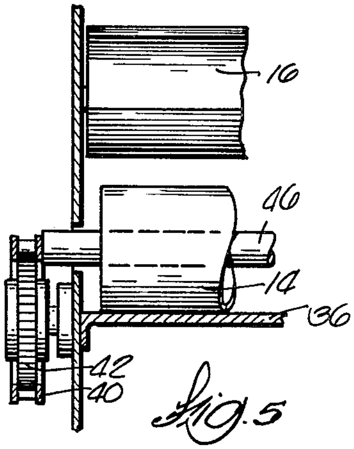
FIG. 5 is a view taken along line 5—5 of FIG. 3.
Figure 4:
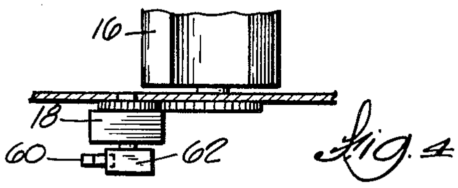
FIG. 4 is a view taken along line 4—4 of FIG. 3.
Figure 6:
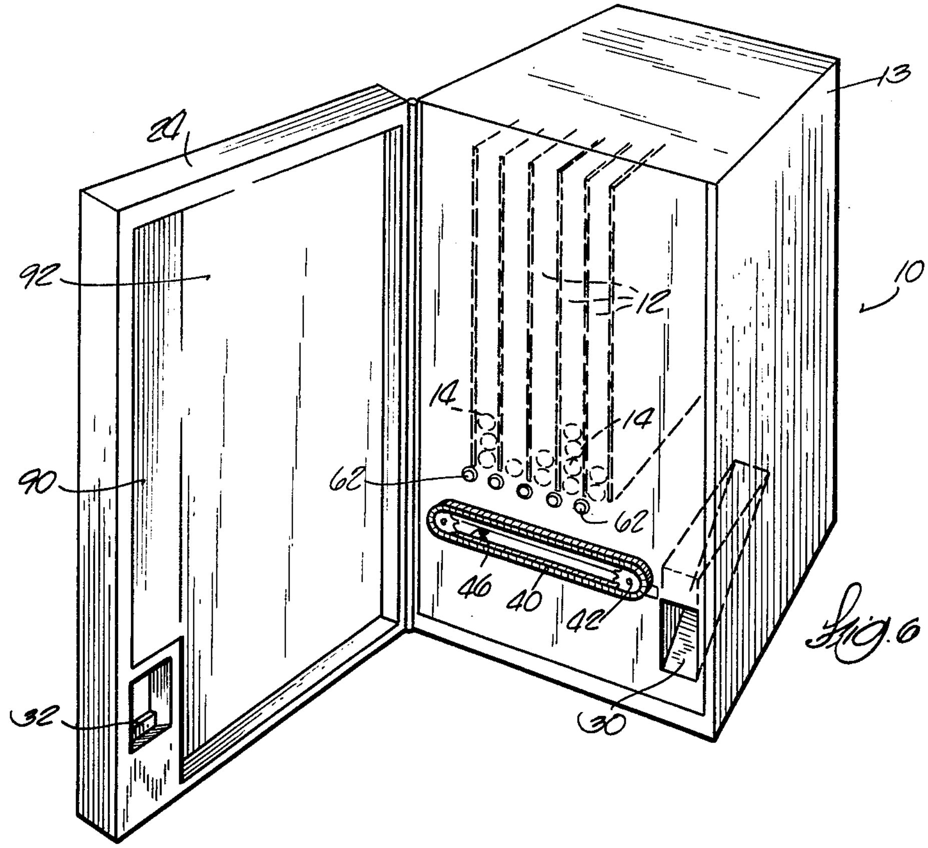
FIG. 6 is a diagrammatic perspective view of a vending machine in accordance with the invention.

In the drawings, the vending machine 10 is provided with conventional equipment such as a coin acceptance unit, not illustrated, and a plurality of storage racks 12 containing vertically stacked cans or bottles 14. The storage racks are supported in a framework within the outer housing or cabinet 13 of the vending machine. Discharge of the cans or bottles 14 from the racks is controlled by a coin actuated vend mechanism. Any typical type of coin vend mechanism can be employed. For purposes of illustration in this application, a star wheel 16 is provided for each can stack. The star wheels 16 can be driven by electric motors 18, as illustrated in FIG. 3, with a gear 20 on the output shaft of the motor meshing with a gear 22 on the star wheels 16. The can storage racks, the star wheels and motors 18 are all located within the interior of the cabinet (FIG. 6) behind the door 24.

As thus far described, the apparatus is conventional. Obviously, various forms of can storage racks can be employed and various vend mechanisms and devices for holding back the row of cans can be used while the leading can is released. The vend mechanisms shown in my co-pending patent application, Ser. No. 097,270, filed Nov. 26, 1979, could be employed.

Figure 1:
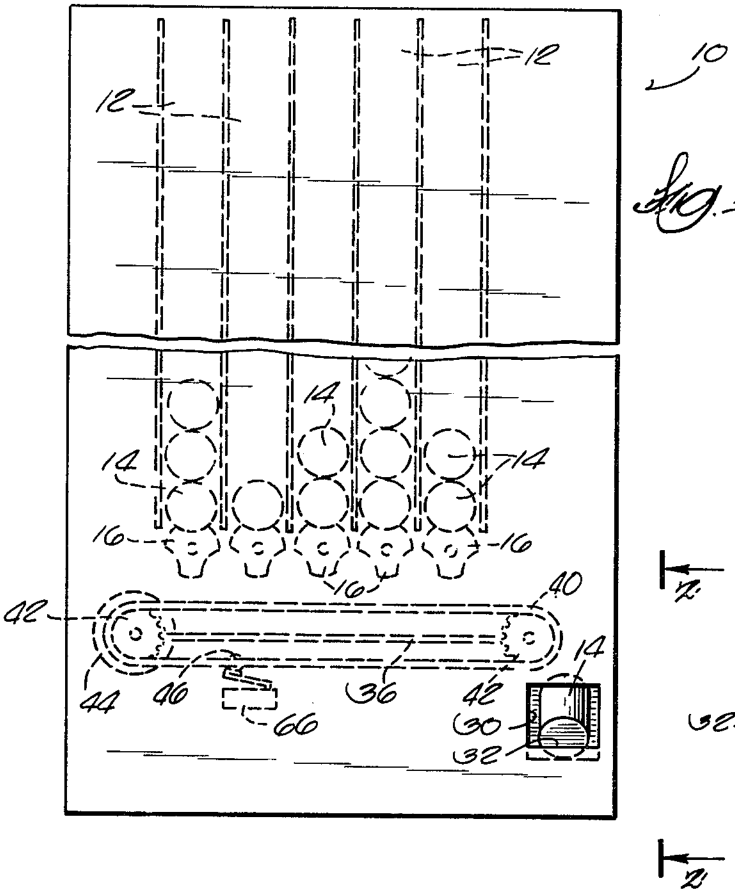
FIG. 1 is a diagrammatic fragmentary front elevational view of a vending machine embodying the invention.
Figure 2:
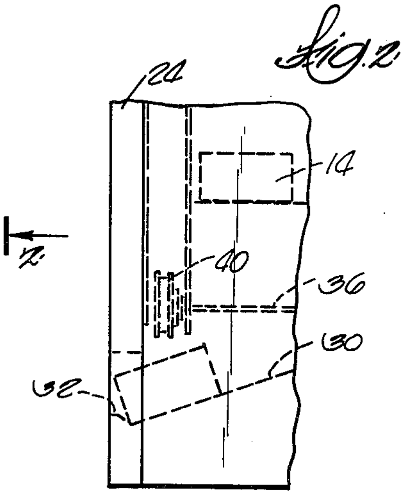
FIG. 2 is a sectional view along line 2—2 of FIG. 1.

In accordance with the invention, means are provided for intercepting the released cans and conveying the released cans to an article discharge chute 30 which communicates with an article delivery chute 32 in the door. In the disclosed construction, a tray or pan 36 (FIGS. 1, 3) is located beneath the can stacks to intercept the released cans. The tray 36 can be either horizontal or inclined slightly upwardly toward the chute 30. Associated with the tray 36 is a conveying mechanism which, as disclosed, comprises a pair of spaced endless chains 40 which are arranged around sprockets 42. The shaft 39 supporting one pair of sprockets is driven by a motor 44. A flight or sweeper bar 46 is connected between the endless chains 40 and spans the tray area which receives the vended containers. The sweep bar or flight bar sweeps each can from the tray into the discharge chute 30.

Figure 7:
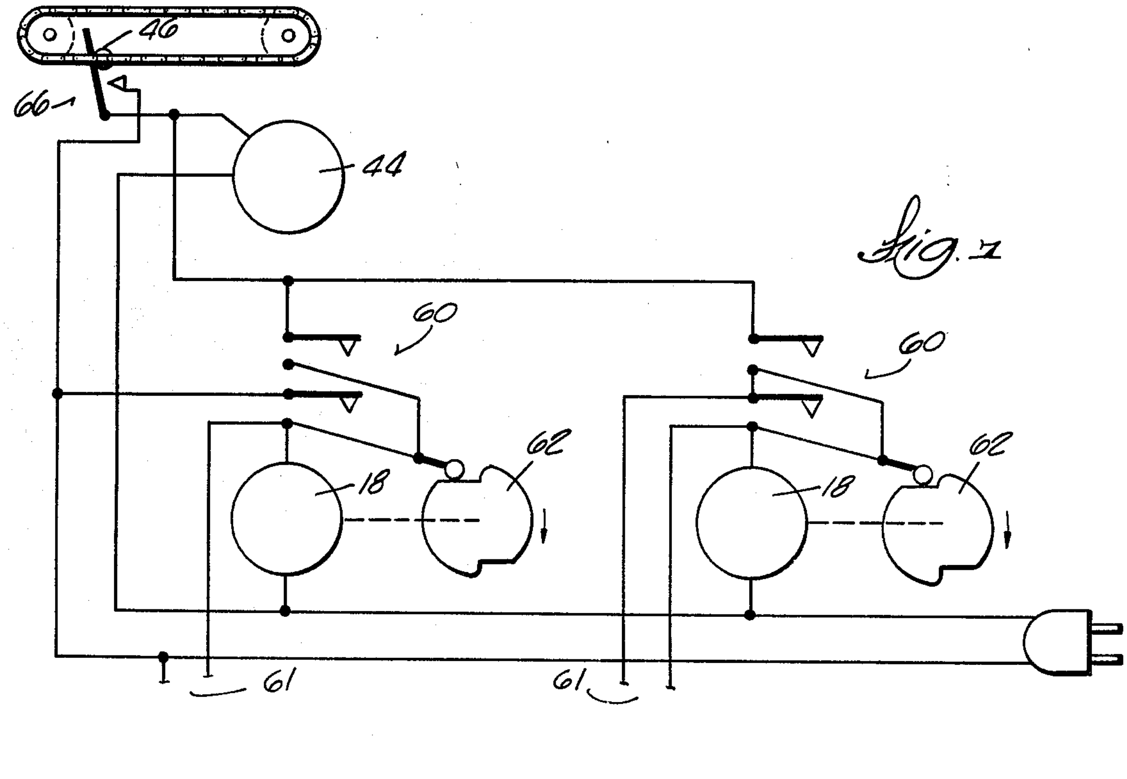
FIG. 7 is a schematic diagram of the circuit of the invention.

A circuit is provided for controlling the motor 44 for the sweep bar and the motors 18 for the star wheels 16. The circuit can include a cam actuated switch 60 for each of the gate control motors 18, with the cam 62 mounted on the output shaft of each motor 18. Completion of a circuit in the coin acceptance mechanism 61 will energize the appropriate gate control motor 18. Rotation of the cam 62 will actuate a switch 60 to energize the motor 44 to move the sweep bar 46. The sweep bar will sweep the can or bottle off the tray as it traverses the upper run of the conveyor chain and, on the lower run of the conveyor chain (shown in FIG. 1), actuates a switch 66 (FIG. 7) which will open the circuit and de-energizes the motor 44, stopping the flight bar at the position shown in FIGS. 1 and 7. As the next can is selected and a vend mechanism again actuated, the sweep bar 46 will commence its route from the FIG. 1 position to sweep the next can from the tray 36. More than one sweep bar 46 can be employed to decrease the time required to sweep the can into the discharge chute 30.

A series of flexible flaps 70 (FIG. 3) supported to depend in the conveying path of the cans can be provided. The flaps 70 will maintain the cans against the sweep bar 46 to insure that the cans are in the proper orientation, i.e. with their longitudinal axes parallel to the sweep bar and normal to the front door of the vending machine. The tray 36 can be either horizontal or inclined slightly upwardly in the direction of the discharge chute to assist in maintaining the cans against the sweep bar 46.

The coin acceptance mechanism, the coin reject slot, the beverage selection buttons and the delivery chute are located in a relatively narrow area or zone 90 on either the right or left side of the door. As illustrated, the zone 90 is on the right hand side of the door. Thus a full length illuminated vertical sign can be employed in the remaining door area 92 which can use five foot long fluorescent lighting tubes.

The use of the sweep bar rather than only an inclined ramp improves tracking of the containers. The sweep bar can run continuously rather than during only the vend cycle if desired. In addition, an inclined ramp reduces the length of the storage racks which reduces capacity.

I claim:

1. In a coin operated vending machine having a frame and door and a plurality of vertically oriented container storage racks supported on said frame and located interiorly of said door and arranged in side by side relationship, with each of said racks being provided with a vend mechanism including gate means for releasing selected containers in response to actuation of an electrical circuit by deposit of proper coinage, the improvement comprising conveying means located beneath the gate controlled storage racks, said conveying means intercepting and conveying laterally a discharged container released by a gate to a first discharge chute located adjacent one side of the vending machine and wherein the door of said vending machine includes a second discharge chute proximate the side edge of the door and in registry with said first chute to emit the conveyed container whereby said door front surface is generally uninterrupted by container access slots to enable use of the door for an advertising display, said vending machine including a pan beneath said storage racks, said conveying means including spaced endless chains, motor means connected to the endless chains to drive the chains in a conveying path, and a sweep bar connected between the spaced chains and engageable with containers deposited on said pan to sweep the containers to said discharge chute, motor means for said gate means and a circuit connecting said motor means of said gates and said motor means for said conveyor, said circuit including a stop switch having a switch actuator positioned in the path of travel of said sweep bar and said stop switch being electrically connected in said circuit whereby energization of said vend mechanism causes energization of said conveyor motor to move the sweep bar across said pan to sweep the deposited container from the pan into said discharge chute and said stop switch being actuated by said sweep bar to de-energize the conveyor motor and stop movement of the sweep bar in advance of the sweeping stroke used to move containers to the discharge chute so that said sweep bar is in position for a complete sweeping stroke for the next vend cycle.

2. The improvement of claim 1 wherein said motor means for said gates includes cams on said motor output shafts and switches associated with said cams for energizing said conveyor motor and de-energizing said gate motors.

* * * * *